United States Patent
Bai et al.

(10) Patent No.: US 9,391,516 B2
(45) Date of Patent: Jul. 12, 2016

(54) SWITCHING CHARGER, THE CONTROL CIRCUIT AND THE CONTROL METHOD THEREOF

(71) Applicant: Chengdu Monolithic Power Systems Co., Ltd., Chengdu (CN)

(72) Inventors: Zhengui Bai, Lin'an (CN); Min Xu, Hangzhou (CN); Xiaoqing Li, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 248 days.

(21) Appl. No.: 14/092,837

(22) Filed: Nov. 27, 2013

(65) Prior Publication Data
US 2014/0152242 A1  Jun. 5, 2014

(30) Foreign Application Priority Data
Nov. 30, 2012 (CN) .......................... 2012 1 0501065

(51) Int. Cl.
*H02M 3/158* (2006.01)
*H02J 7/00* (2006.01)
*H02M 1/00* (2006.01)

(52) U.S. Cl.
CPC .............. *H02M 3/158* (2013.01); *H02J 7/0052* (2013.01); *H02J 2007/0059* (2013.01); *H02M 2001/0025* (2013.01)

(58) Field of Classification Search
CPC ..................... H02M 3/158; H02M 2001/0032; H02M 3/33507

USPC ......... 323/222, 224, 271–275, 282, 290, 277; 363/17, 21.12, 21.17, 89, 97, 98, 131
See application file for complete search history.

(56) References Cited

U.S. PATENT DOCUMENTS

| | | | | |
|---|---|---|---|---|
| 4,456,872 | A * | 6/1984 | Froeschle | H02M 3/33507 323/267 |
| 5,734,259 | A * | 3/1998 | Sisson | H02M 3/1563 323/282 |
| 5,912,552 | A * | 6/1999 | Tateishi | H02M 3/1588 323/224 |
| 6,229,292 | B1 * | 5/2001 | Redl | G05F 1/565 323/224 |
| 6,304,066 | B1 * | 10/2001 | Wilcox | H02M 3/156 323/282 |
| 7,315,153 | B2 * | 1/2008 | Tazawa | H02M 3/1584 323/272 |
| 7,876,077 | B2 * | 1/2011 | Nishimori | H02M 1/44 323/282 |
| 8,008,902 | B2 * | 8/2011 | Melanson | H02M 3/1563 323/285 |
| 8,773,090 | B2 * | 7/2014 | Ouyang | H02M 3/1588 323/271 |
| 2012/0001603 | A1 | 1/2012 | Ouyang | |
| 2012/0062144 | A1 | 3/2012 | Yao | |

* cited by examiner

*Primary Examiner* — Rajnikant Patel
(74) *Attorney, Agent, or Firm* — Perkins Coie LLP (57) ABSTRACT

A switching charger having a control circuit configured to provide a control signal; a power stage turned ON and OFF by the control signal; an inductor coupled between the power stage and a load; and an output capacitor coupled in parallel with the load; wherein the control circuit limits a current flowing through the inductor in a hysteretic window, and wherein the hysteretic window is adjusted according to an ON time of the control signal.

14 Claims, 7 Drawing Sheets

SWITCHING CHARGER, THE CONTROL CIRCUIT AND THE CONTROL METHOD THEREOF

CROSS-REFERENCE TO RELATED APPLICATIONS

This application claims priority to and the benefit of Chinese Patent Application No. 201210501065.5, filed Nov. 30, 2012, which is incorporated herein by reference in its entirety.

TECHNICAL FIELD

The present invention relates to electronic circuits, and more particularly but not exclusively to switching chargers and the method thereof.

BACKGROUND

Figure 1:
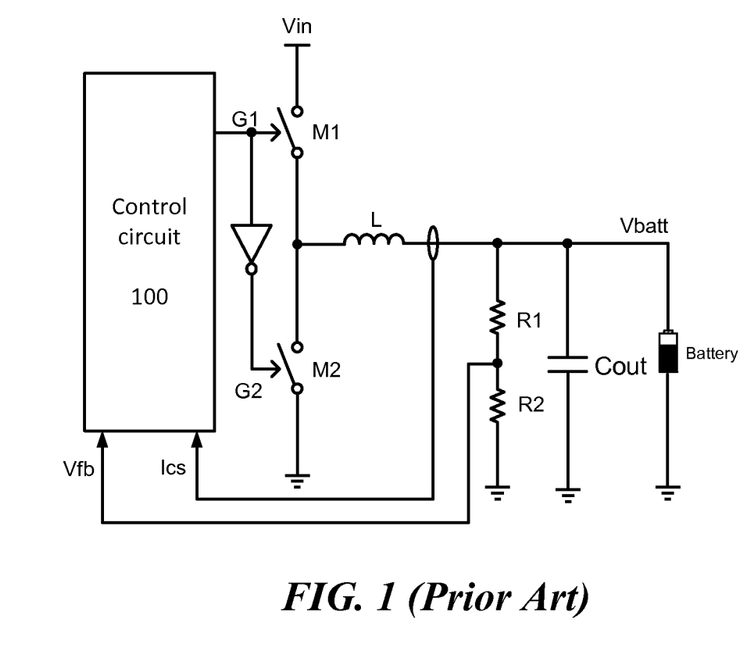
FIG. 1 schematically shows a prior art switching charger.

Chargers are adopted to control charging process to batteries. Normally, a switching charger works under a constant current mode firstly, and then works under a constant voltage mode. A prior art switching charger controls a current flowing through an inductor in a hysteretic window to achieve the constant current mode. FIG. 1 schematically shows a prior art switching charger. As shown in FIG. 1, a control circuit 100 detects a current flowing through an inductor L to generate a current sense signal Ics. Meanwhile, the control circuit 100 receives a feedback signal Vfb indicating a charging voltage Vbatt via a voltage divider consisting of resistors R1 and R2. Based on the current sense signal Ics and the feedback signal Vfb, the control circuit 100 generates a control signal G1 to control the power switches M1 and M2, so as to control charging process to the load, i.e., the battery. However, the switching frequency of the prior art switching charger varies in a wide range and is not suitable for some applications.

SUMMARY

It is an object of the present invention to provide an improved switching charger with limited switching frequency.

In accomplishing the above objective, there has been provided, in accordance with an embodiment of the present invention, a switching charger, comprising: a control circuit configured to provide a control signal; a power stage having a high-side power switch and a low-side power switch coupled in series, the high-side power switch and the low-side power switch turned ON and OFF alternatively by the control signal; an inductor having a first terminal coupled to a connection of the high-side power switch and the low-side power switch, and a second terminal coupled to a load, a current flowing through the inductor being limited in a hysteretic window by the control circuit, and the hysteretic window being adjusted according to an ON time of the control signal; and an output capacitor having a first terminal coupled to the second terminal of the inductor, and a second terminal coupled to a reference ground.

Furthermore, there has been provided, in accordance with an embodiment of the present invention, A control circuit for a switching charger, wherein the switching charger has a high-side power switch, a low-side power switch and an inductor, the circuit comprising: a feedback amplifier having a first input terminal configured to receive feedback signal indicating the charging voltage, a second input terminal configured to receive a feedback reference signal, and an output terminal configured to generate an amplified feedback signal based on the feedback signal and the feedback reference a select circuit having a first input terminal configured to receive a current reference a second input terminal coupled to the feedback amplifier to receive the amplified signal, and an output terminal configured to generate a current control signal based on current reference signal and the amplified feedback signal, wherein the current control signal is either the current reference signal or the amplified feedback signal whichever the lower value; a hysteretic control circuit having a first input terminal coupled to the terminal of the select circuit to receive the current control signal, a second input terminal configured to receive the input voltage, a third input terminal configured to receive the charging voltage, a fourth input terminal coupled to the output terminal of the control circuit to receive the control signal, and a fifth input terminal configured to receive a frequency control signal having pulses at moment when the power stage is turned ON, wherein based on the current control signal, the input voltage, the charging voltage, the control signal and the frequency control signal, the hysteretic control circuit provides a lower limit signal via a first output terminal, and a higher limit signal via a second output terminal; a comparison circuit having a first input terminal coupled to the first output terminal of the hysteretic control circuit to receive the lower limit signal, a second input terminal coupled to the second output terminal of the hysteretic control circuit to receive the higher limit signal, a third input terminal configured to receive a current sense signal indicating a current flowing through the inductor, and based on the lower limit signal, the higher limit signal, and the current sense signal, the comparison circuit provides a set signal via a first output terminal, and a reset signal via a second output terminal; and a logic circuit having a set terminal coupled to the comparison circuit to receive the set signal, a reset terminal coupled to the comparison circuit to receive the reset signal, and an output terminal configured to generate the control signal based on the set signal and the reset signal.

In addition, there has been provided, in accordance with an embodiment of the present invention, a control method for a switching charger, wherein the switching charger has a high-side power switch and a low-side power switch, comprising: amplifying an error between a feedback signal indicating an output voltage of the switching charger and a feedback reference signal to generate an amplified feedback signal; selecting the smaller value of the amplified feedback signal and a current reference signal to be a current control signal; generating a hysteretic window signal; generating a higher limit signal and a lower limit signal based on the current control signal and the hysteretic window signal; turning OFF the high-side power switch when the a current sense signal indicating a current flowing through the inductor is higher than the higher limit signal, and turning ON the high-side power switch when the current sense signal is lower than the lower limit signal.

The presented switching charger and the method thereof limits a current flowing through the inductor in a hysteretic window, and wherein the hysteretic window is adjusted according to an ON time of the control signal, so as to control the switching frequency of the switching charger be a constant value.

The use of the similar reference label in different drawings indicates the same of like components.

DETAILED DESCRIPTION

Embodiments of switching chargers are described in detail herein. In the following description, some specific details, such as example circuits for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

Figure 2:
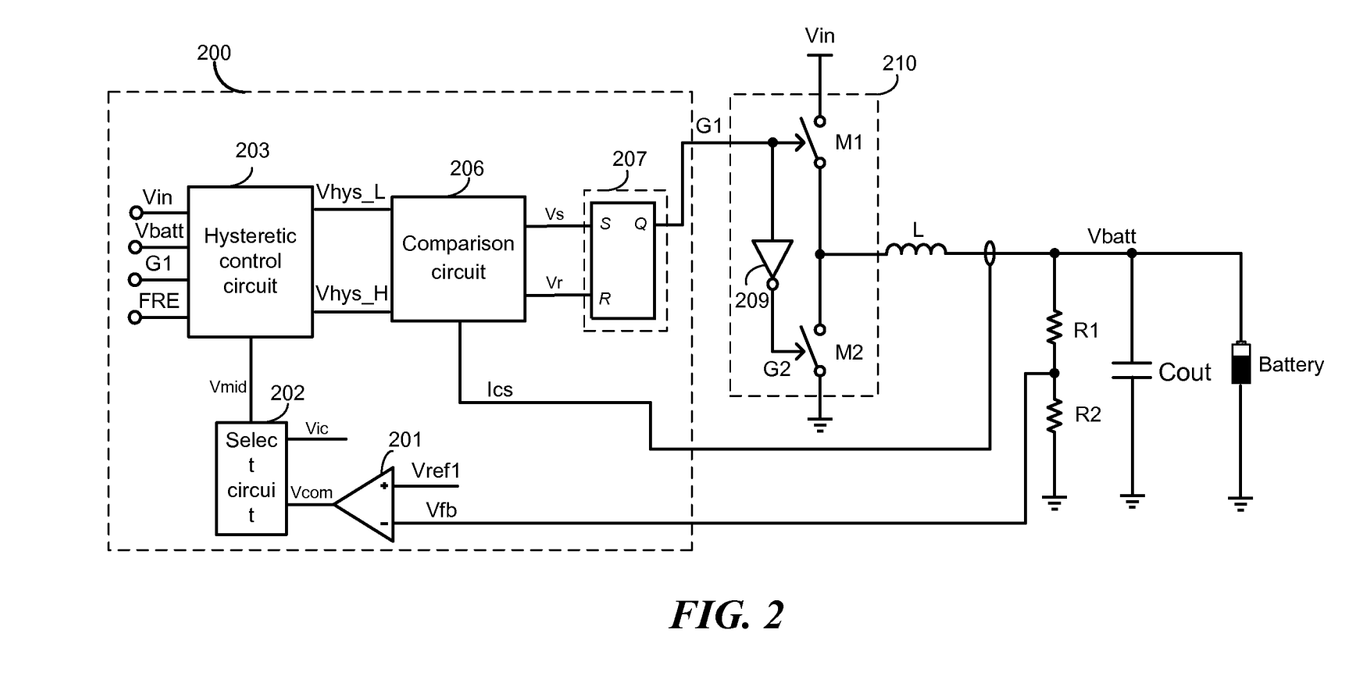
FIG. 2 schematically shows a switching charger in accordance with an embodiment of the present invention.

FIG. 2 schematically shows a switching charger in accordance with an embodiment of the present invention. In the example of FIG. 2, the switching charger receives an input voltage Vin, and then provides a charging current and a charging voltage Vbatt to a battery based thereupon. The switching charger comprises: a control circuit 200 configured to provide a control signal G1; a power stage 210 having an input terminal, a ground terminal, a control terminal and an output terminal SW, the input terminal being configured to receive the input voltage Vin, the ground terminal being coupled to a reference ground, and the control terminal being coupled to the control circuit 200 to receive the control signal G1, wherein the power stage 210 having a high-side power switch M1 and a low-side power switch M2 coupled in series, and the high-side power switch M1 and the low-side power switch are turned ON and OFF alternatively by the control signal G1; an inductor L having a first terminal coupled to the output terminal SW of the power stage 210, and a second terminal coupled to a load; and an output capacitor Cout having a first terminal coupled to the second terminal of the inductor L, and a second terminal coupled to the reference ground.

In the example of FIG. 2, the power stage 210 is defined as being turned ON when the high-side power switch M1 is ON and the low-side power switch M2 is OFF. The power stage 210 is defined as being turned OFF when the high-side power switch M1 is OFF and the low-side power switch M2 is ON. In one embodiment, the power switches M1 and M2 comprise controllable devices, e.g., MOSFET (Metal Oxide Semiconductor Field Effect Transistor), Bipolar Junction Transistor and so on. In one embodiment, the high-side power switch M1 is controlled by the control signal G1, and the power stage 210 further comprises an inverter 209 configured to invert the control signal G1 to a signal G2 to control the low-side power switch M2. In one embodiment, the high-side power switch M1 comprises the controllable devices, e.g., MOSFET, Bipolar Junction Transistor and so on, while the low-side power switch M2 comprises a diode.

In one embodiment, the first terminal of the inductor L is coupled to the input voltage Vin when the power stage 210 is ON and is coupled to the reference ground when the power stage 210 is OFF.

As shown in FIG. 2, the control circuit 200 comprises: a feedback amplifier 201 having a first input terminal configured to receive a feedback signal Vfb indicating the charging voltage Vbatt, a second input terminal configured to receive a feedback reference signal Vref1, and an output terminal configured to generate an amplified feedback signal Vcom based on the feedback signal Vfb and the feedback reference signal Vref1; a select circuit 202 having a first input terminal configured to receive a current reference signal Vic, a second input terminal coupled to the feedback amplifier 201 to receive the amplified feedback signal Vcom, and an output terminal configured to generate a current control signal Vmid based on the current reference signal Vic and the amplified feedback signal Vcom; a hysteretic control circuit 203 having a first input terminal coupled to the output terminal of the select circuit 202 to receive the current control signal Vmid, a second input terminal configured to receive the input voltage Vin, a third input terminal configured to receive the charging voltage Vbatt, a fourth input terminal coupled to the output terminal of the control circuit 200 to receive the control signal G1, and a fifth input terminal configured to receive a frequency control signal FRE having pulses at moment when the power stage 210 is turned ON, wherein based on the current control signal Vmid, the input voltage Vin, the charging voltage Vbatt, the control signal G1, and the frequency control signal FRE, the hysteretic control circuit 203 provides a lower limit signal Vhys_L via a first output terminal, and a higher limit signal Vhys_H via a second output terminal; a comparison circuit 206 having a first input terminal coupled to the first output terminal of the hysteretic control circuit 203 to receive the lower limit signal Vhys_L, a second input terminal coupled to the second output terminal of the hysteretic control circuit 203 to receive the higher limit signal Vhys_H, a third input terminal configured to receive a current sense signal Ics indicating a current flowing through the inductor L, and based on the lower limit signal Vhys_L, the higher limit signal Vhys_H, the current sense signal Ics, the comparison circuit 206 provides a set signal Vs via a first output terminal, and a reset signal Vr via a second output terminal; and a logic circuit 207 having a set terminal coupled to the comparison circuit 206 to receive the set signal Vs, a reset terminal coupled to the comparison circuit 206 to receive the reset signal Vr, and an output terminal configured to generate the control signal G1 based on the set signal Vs and the reset signal Vr.

In one embodiment, the logic circuit 207 comprises a RS flip-flop having a set terminal coupled to the comparison circuit 206 to receive the set signal Vs, a reset terminal coupled to the comparison circuit 206 to receive the reset signal Vr, and an output terminal configured to generate the control signal G1 based on the set signal Vs and the reset signal Vr.

Figure 3:
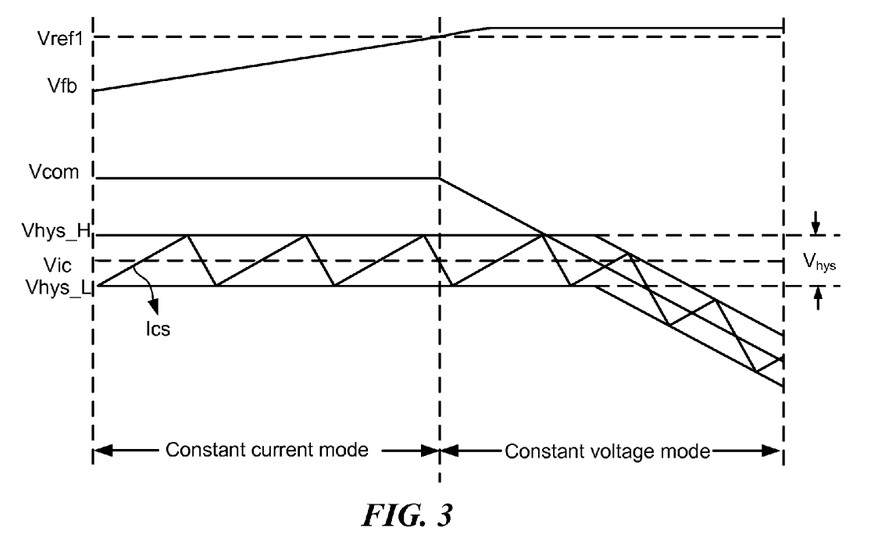
FIG. 3 shows the waveforms of the signals of the switching charger in FIG. 2.

FIG. 3 shows the waveforms of the signals of the switching charger in FIG. 2. The operation of the switching charger in FIG. 2 is described with reference to FIGS. 2 and 3. As shown in FIG. 3, the operation of the switching charger comprises a constant current mode and a constant voltage mode. When the switching charger works under constant current mode, the switching charger provides a constant current to the load, i.e. the battery. When the switching charger works under constant voltage mode, the switching charger provides a constant voltage to the load, i.e., the battery.

When the switching charger works under constant current mode, the charging voltage Vbatt is lower than a preset value, i.e., the feedback signal Vfb is lower than the feedback reference signal Vref1, causing the saturation of the feedback amplifier 201. So the output signal Vcom of the feedback amplifier 201 is logical high, and is higher than the current reference signal Vic (the current reference signal Vic has a preset constant value). The select circuit 202 chooses the lower value of the amplified feedback signal Vcom and the current reference signal Vic as the current control signal Vmid. So the current reference signal Vic is chosen to be the current control signal Vmid by the select circuit 202 under constant current mode. The hysteretic control circuit 103 generates the lower limit signal Vhys_L and the higher limit signal Vhys_H based on the input voltage Vin, the charging voltage Vbatt, the control signal G1, the frequency control signal FRE and the current control signal Vmid. The comparison circuit 206 compares the current sense signal Ics with the higher limit signal Vhys_H and the lower limit signal Vhys_L. During when the high-side power switch M1 is turned OFF, and the low-side power switch M2 is turned ON, the comparison circuit 206 generates the set signal Vs to set the logic circuit 207 so as to turn ON the high-side power switch M1 and to turn OFF the low-side power switch M2 if the current sense signal Ics decreases to the lower limit signal Vhys_L. After that, the inductor L receives the input voltage Vin, and the current flowing through the inductor L increases. As a result, the current sense signal Ics increases. The comparison circuit 206 generates the reset signal Vr to reset the logic circuit 207 so as to turn OFF the high-side power switch M1 and to turn ON the low-side power switch M2 when the current sense signal Ics increases to the higher limit signal Vhys_H. After that, the inductor L is coupled to the reference ground, and the current flowing through the inductor L decreases, i.e., the current sense signal Ics decreases. The value of the current control signal Vmid is the average value of the higher limit signal Vhys_H and the lower limit signal Vhys_L, i.e., the value of the current control signal Vmid indicates the average current flowing through the inductor L, and the charging current provided to the load. Thus, the charging current is constant as long as the current control signal Vmid is constant.

When the battery is charged by a constant current under constant current mode, the charging voltage Vbatt increases. When the feedback signal Vfb representing the charging voltage Vbatt increases to the feedback reference signal Vref1, the switching charger works under constant voltage mode. The amplified feedback signal Vcom decreases as the feedback signal Vfb increases. When the amplified feedback signal Vcom decreases to the current reference signal Vic, the amplified feedback signal Vcom is chosen by the select circuit 202 as the current control signal Vmid. As described before, the current control signal Vmid indicates the charging current provided to the load. So when the amplified feedback signal Vcom decreases as the feedback signal Vfb increases, the charging current decreases too. As a result, the increase of the charging voltage Vbatt slows down. After the decrease of the charging current and the increase of the charging voltage Vbatt reach equilibrium, the charging voltage Vbatt is constant and has a value corresponding to the feedback reference signal Vref1 because the feedback signal Vfb is clamped to the feedback reference signal Vref1 by the feedback amplifier 201.

In one embodiment, the power stage 210 comprises a drive circuit configured to increase the drive capability of the control signals G1 and G2.

Figure 4:
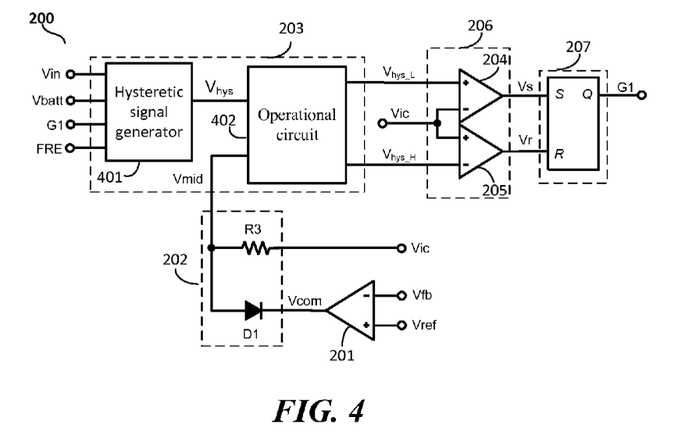
FIG. 4 schematically shows a circuit configuration of the control circuit 200 in accordance with an embodiment of the present invention.

FIG. 4 schematically shows a circuit configuration of the control circuit 200 in accordance with an embodiment of the present invention.

In one embodiment, the select circuit 202 comprises: a diode D1 having a cathode terminal coupled to the feedback amplifier 201 to receive the amplified feedback signal Vcom, and an anode terminal; a resistor R3 having a first terminal coupled to the anode terminal of the diode D1 and a second terminal configured to receive a current reference signal Vic; wherein: the diode D1 is OFF when the current reference signal Vic is lower than or equal to the amplified feedback signal Vcom, and current reference signal Vic is chosen to be the current control signal Vmid; the diode D1 is ON when the current reference signal Vic is higher than the amplified feedback signal Vcom, and the amplified feedback signal is chosen to be the current control signal Vmid.

In one embodiment, the hysteretic control circuit 203 comprises: a hysteretic signal generator 401 having a first input terminal configured to receive the input voltage Vin, a second input terminal configured to receive the charging voltage Vbatt, a third input terminal coupled to the output terminal of the control circuit 200 to receive the control signal G1, a fourth input terminal configured to receive the frequency control signal FRE, and an output terminal configured to generate a hysteretic signal Vhys based on the input voltage Vin, the charging voltage Vbatt, the control signal G1 and the frequency control signal FRE; and an operational circuit 402 having a first input terminal coupled to the output terminal of the hysteretic signal generator 401 to receive the hysteretic signal Vhys, a second input terminal coupled to the select circuit 202 to receive the current control signal Vmid, wherein based on the hysteretic signal Vhys and the current control signal Vmid, the operational circuit 402 provides the lower limit signal Vhys_L via a first output terminal, and provides the higher limit signal Vhys_H via a second output terminal.

In one embodiment, the frequency control signal FRE comprises the set signal Vs. The set signal has pulse to set the RS flip-flop at every switching cycle. And the control signal G1 turns ON the high-side power switch M1 when the RS flip flop is set. The frequency control signal FRE may comprises any signal that has pulse at the moment the high-side power switch M1 is turned ON.

Figure 5:
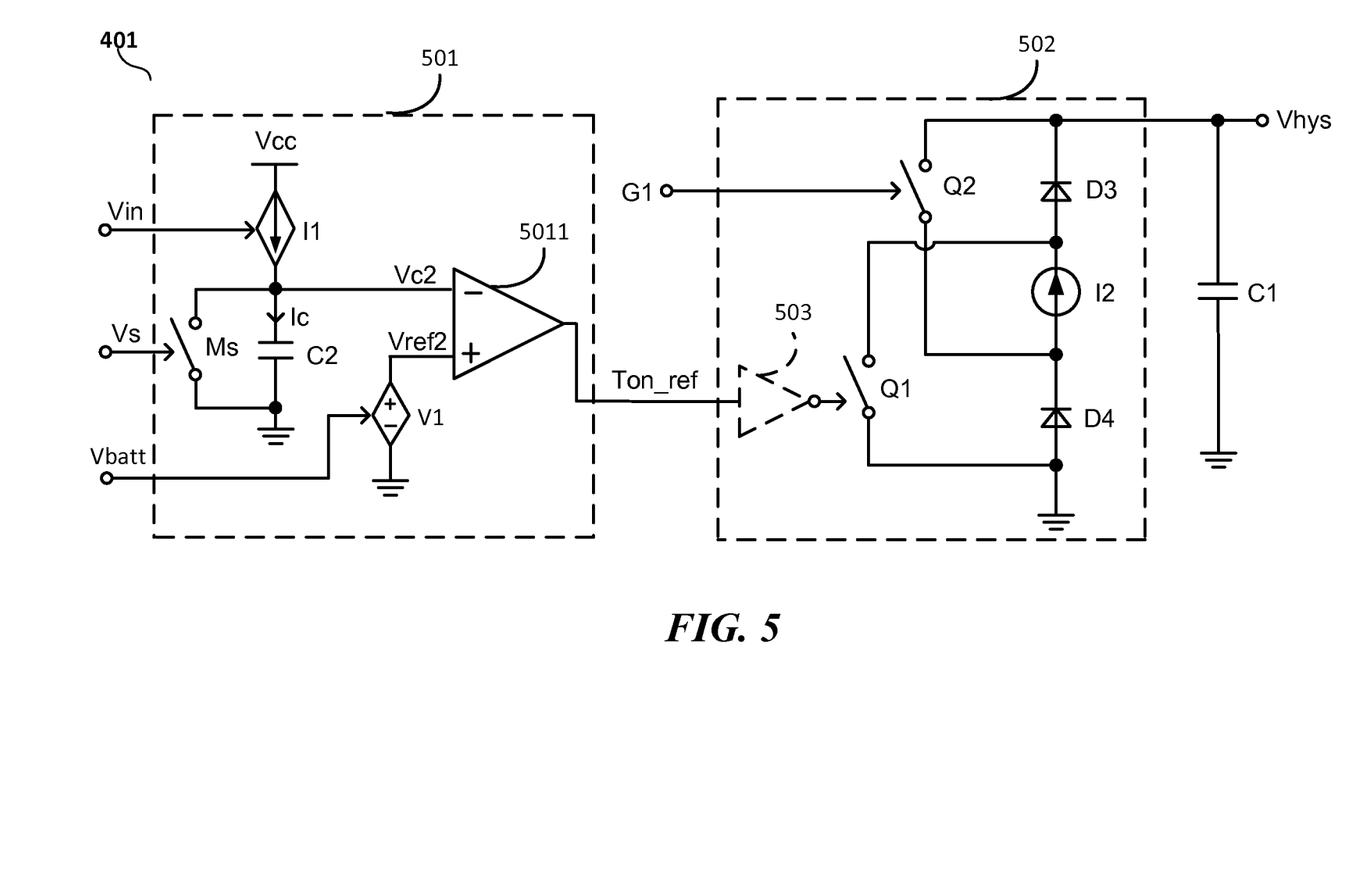
FIG. 5 schematically shows a circuit configuration of a hysteretic signal generator 401 in accordance with an embodiment of the present invention.

FIG. 5 schematically shows a circuit configuration of the hysteretic signal generator 401 in accordance with an embodiment of the present invention. In the example of FIG. 5, the hysteretic signal generator 401 comprises: a COT (Constant ON Time) signal generator 501 having a first input terminal configured to receive the input voltage Vin, a second input terminal configured to receive the set signal Vs, a third input terminal configured to receive the charging voltage Vbatt, and an output terminal configured to generate a COT signal Ton_ref based on the input voltage Vin, the set signal Vs and the charging voltage Vbatt; a charge and discharge circuit 502 having a first input terminal coupled to the COT signal generator 501 to receive the COT signal Ton_ref, a second input terminal coupled to the output terminal of the control circuit 200 to receive the control signal G1, and an output terminal configured to provide a charge/discharge current based on the COT signal Ton_ref and the control signal G1; and a hysteretic capacitor C1 having a first terminal coupled to the output terminal of the charge and discharge circuit 502 to receive the charge/discharge current, and a second terminal coupled to the reference ground, wherein the hysteretic capacitor C1 provides the hysteretic signal Vhys on the first terminal. In one embodiment, the charge and discharge circuit 502 further comprises an inverter 503 configured to invert the COT signal Ton_ref.

In one embodiment, the COT signal generator 501 comprises: a first controlled current source I1 having an input terminal configured to receive an internal power supply Vcc, a control terminal configured to receive the input voltage Vin, and an output terminal configured to provide a charge current Ic; a reference capacitor C2 having a first terminal coupled to the first controlled current source I1 to receive the charge current Ic, and a second terminal coupled to the reference ground, wherein the reference capacitor C2 provides a sawtooth signal Vc2 on the first terminal; a frequency switch Ms having a first terminal coupled to the first terminal of the reference capacitor C2, a second terminal coupled to the second terminal of the reference capacitor C2, and a control terminal configured to receive the set signal Vs, wherein the frequency switch Ms is turned ON by the pulse of the set signal Vs; a controlled voltage source V1 having a first terminal configured to provide a COT reference signal Vref2 relating to the charging voltage Vbatt, a second terminal coupled to the reference ground, and a control terminal configured to receive the charging voltage Vbatt; and a COT comparator 5011 having a first input terminal (inverting input terminal) coupled to the reference capacitor C2 to receive the sawtooth signal Vc2, a second input terminal (non-inverting input terminal) coupled to the controlled voltage source V1 to receive the COT reference signal Vref2, and an output terminal configured to generate the COT signal Ton_ref based on the sawtooth signal Vc2 and the COT reference signal Vref2.

In one embodiment, the charge current Ic provided by the first controlled current source I1 is directly proportional to the input voltage Vin:

$$Ic = K1 \times Vin \tag{1}$$

Wherein K1 is constant.

In one embodiment, a relationship between the COT reference signal Vref2 provided by the controlled current source V1 and the charging voltage Vbatt is:

$$Vref2 = K2 \times Vbatt \tag{2}$$

Wherein K2 is constant.

In a switching cycle, the frequency switch Ms is turned ON at the pulse of the set signal Vs. Then the reference capacitor C2 is discharged and the sawtooth signal Vc2 decreases to zero. As a result, the COT signal Ton_ref is logical high. When the frequency switch Ms is turned OFF at the end of the pulse of the set signal Vs, the first controlled current source I1 charges the reference capacitor C2, and the sawtooth signal Vc2 increases. When the sawtooth signal Vc2 reaches the COT reference signal Vref2, the COT comparator 5011 flips, and the COT signal Ton_ref becomes logical low. The sawtooth signal Vc2 continues to increase until the frequency switch Ms is turned ON. Then the reference capacitor C2 is discharged, and the COT signal Ton_ref becomes logical high again. The operation repeats, and the COT signal has a waveform shown in FIG. 6. In one embodiment, the logical high period of the COT signal Ton_ref is defined as ON time, while the logical low period of the COT signal Ton_ref is defined as OFF time. The ON time TON of the COT signal Ton_ref is constant when the charge current Ic, the reference capacitor C2 and the COT reference signal Vref2 are set. The ON time TON is also referred as constant ON time.

The ON time TON of the COT signal Ton_ref could be written as:

$$TON = \frac{K2}{K1} \times C2 \times \frac{Vbatt}{Vin} \tag{3}$$

In one embodiment, the charge and discharge circuit 502 comprises: a second current source I2 having an input terminal and an output terminal; a first switch Q1 having a first terminal coupled to the output terminal of the second current source I2, a second terminal coupled to the reference ground, and a control terminal coupled to the COT signal generator 501 to receive the COT signal Ton_ref; a second switch Q2 having a first terminal coupled to the first terminal of the hysteretic capacitor C1, a second terminal coupled to the input terminal of the second current source I2, and a control terminal coupled to the output terminal of the control circuit 200 to receive the control signal G1; a third switch D3 having a first terminal coupled to the output terminal of the second current source I2, and a second terminal coupled to the first terminal of the hysteretic capacitor C1; and a fourth switch D4 having a first terminal coupled to the reference ground, and a second terminal coupled to the input terminal of the second current source I2; wherein when the ON time of the control signal G1, i.e., the ON time of the high-side power switch M1, is shorter than the ON time TON of the COT signal Ton_ref, the second current source I2 charges the hysteretic capacitor C1; when the ON time of the control signal G1 is longer than the ON time TON of the COT signal Ton_ref, the second current source I2 discharges the hysteretic capacitor C1; and when the ON time of the control signal G1 is equal to the ON time TON of the COT signal Ton_ref, the charges in the hysteretic capacitor C1 remain the same.

In one embodiment, the first switch Q1 may be turned ON by a logical low signal while the second switch Q2 may be turned ON by a logical high signal. In some embodiments, the first switch Q1 may be turned ON by a logical high signal and the second switch Q2 may be turned ON by a logical high signal too. Thus, the inverter 503 may be omitted in some embodiments.

Figure 6:
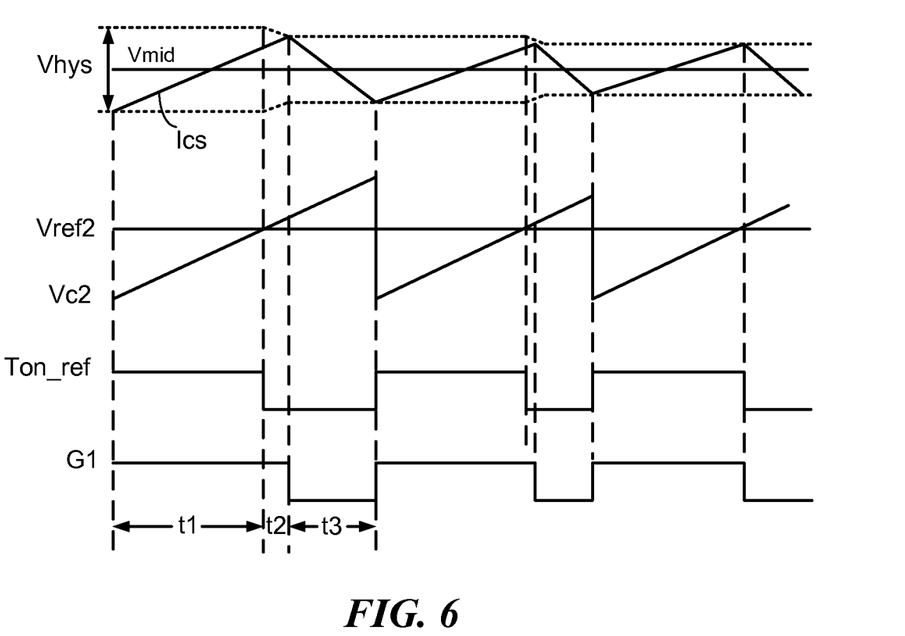
FIG. 6 shows the waveforms of the signals of the hysteretic signal generator 401 in FIG. 5.

FIG. 6 shows the waveforms of the signals of the hysteretic signal generator 401 in FIG. 5. The operation of the hysteretic signal generator is described with reference to FIGS. 5 and 6.

During subinterval t1, the control signal G1 and the COT signal Ton_ref are both logical high. As a result, the first switch Q1 is turned OFF and the second switch Q2 is turned ON. Then the current provided by the second current source I2 flows through the circle consisting of the second current source I2, the third switch D3 and the second switch Q2. At this time, the hysteretic signal Vhys remains the same. During subinterval t2, the control signal G1 is logical high and the COT signal Ton_ref is logical low. As a result, the first switch Q1 and the second switch Q2 are both turned ON. Then the current provided by the second current source I2 flows through the circle consisting of the second current source I2, the second switch Q2 and the first switch Q1. During this time, the hysteretic capacitor C1 is discharged, and the hysteretic signal Vhys decreases. During subinterval t3, the control signal G1 and the COT signal Ton_ref are both logical low. As a result, the first switch Q1 is turned ON, and the second switch Q2 is turned OFF. Then the current provided by the second current source I2 flows through the circle consisting of the second current source I2, the first switch Q1 and the fourth switch D4. During this time, the hysteretic signal Vhys remains the same too. As can be seen from FIGS. 5 and 6, the hysteretic capacitor C1 is discharged and the hysteretic signal Vhys decreases only when the ON time of the control signal G1 is longer than the ON time of the COT signal Ton_ref.

Based on the similar theory, the first switch Q1 and the second switch Q2 are turned OFF when the control signal G1 is logical low and the COT signal Ton_ref is logical high. During this time, the current provided by the second current source I2 flows through a circle consisting of the second current source I2, the third switch D3 and the fourth switch D4. Meanwhile, the hysteretic capacitor C1 is charged and the hysteretic signal Vhys increases.

In a conclusion, the hysteretic signal Vhys decreases when the ON time of the control signal G1 is longer than the ON time of the COT signal Ton_ref. Because the hysteretic signal Vhys represents the hysteretic window of an inductor current flowing through the inductor L, and the rising slope of the inductor current is fixed, the rising time will decrease when the hysteretic window of the inductor current decreases. The hysteretic signal Vhys increases when the ON time of the control signal G1 is shorter than the ON time of the COT signal Ton_ref. As a result, the hysteretic window of an inductor current flowing through the inductor L increases in the next switching cycle, then the rising time will increase. The rising time is equivalent to the ON time of the control signal G1. It could be concluded that the ON time of the control signal G1 is regulated to be equal to the ON time of the COT signal Ton_ref.

The solution of Equation (3) for the switching frequency fsw yields:

$$fsw = \frac{D}{TON} = \frac{Vbatt/Vin}{\frac{K2}{K1} \times C2 \times \frac{Vbatt}{Vin}} = \frac{K1}{K2 \times C2} \quad (4)$$

Wherein D is the duty cycle of the switching charger. As can be seen from the Equation (4) that the switching frequency fsw is fixed and is decided by the capacitance of the reference capacitor C2, the constants K1 and the constant K2.

As can be seen from the above description that the current flowing through the inductor L is limited in a hysteretic window determined by the hysteretic signal. Because the hysteretic window is adjusted according to the ON time TON of the control signal G1, the switching frequency fsw of the switching charger is fixed to a constant value.

Figure 7:
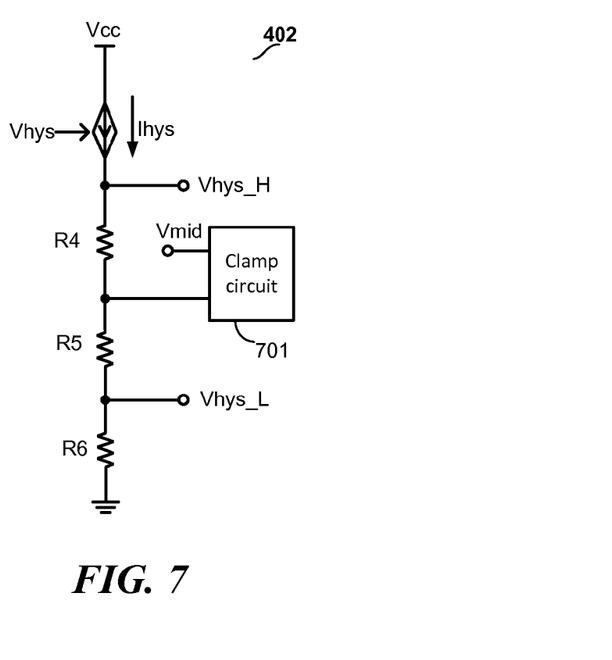
FIG. 7 schematically shows a circuit configuration of the operational circuit 402 in accordance with an embodiment of the present invention.

FIG. 7 schematically shows a circuit configuration of the operational circuit 402 in accordance with an embodiment of the present invention. As shown in FIG. 7, the operational circuit 402 comprises: a second controlled current source Ihys having a first terminal configured to receive the internal power supply Vcc, a control terminal coupled to the hysteretic signal generator 401 to receive the hysteretic signal Vhys, and an output terminal configured to provided a current K3×Vhys that is proportional to the hysteretic signal Vhys; a first resistor R4 having a first terminal and a second terminal, the first terminal configured to provide the higher limit signal Vhys_H; a second resistor R5 having a first terminal coupled to the second terminal of the first resistor R4, and a second terminal configured to provide the lower limit signal Vhys_L; a third resistor R6 having a first terminal coupled to the second terminal of the second resistor R5, and a second terminal coupled to the reference ground; and a clamp circuit 701 having a first terminal coupled to the select circuit 202 to receive the current control signal Vmid, and a second terminal coupled to the connection of the first resistor R4 and the second resistor R5, wherein the voltage at the connection of the first resistor R4 and the second resistor R5 is clamped to the current control signal Vmid.

In one embodiment, the internal power supply Vcc is equal to the input voltage Vin. In one embodiment, the internal power supply Vcc is generated by a bandgap circuit known to persons of ordinary skill in the art.

The operation of the clamp circuit 701 is well known by persons of ordinary skill in the art, and is not described here for brevity.

As can be seen from FIG. 7, the higher limit signal Vhys_H and the lower limit signal Vhys_L may be written as:

$$Vhys\_H = Vmid + K3 \times Vhys \times R4 = Vmid + \tfrac{1}{2} \times Vhys \quad (5)$$

$$Vhys\_L = Vmid - K3 \times Vhys \times R5 = Vmid - \tfrac{1}{2} Vhys \quad (6)$$

Wherein the resistance of the resistor R4 is equal to the resistance of the resistor R5, and the product of the resistance of resistor R4 and the constant K3 is ½.

Persons of ordinary skill in the art should know that any circuit may generate the higher limit signal Vhys_H and the lower limit signal Vhys_L as expressed by the Equations (5) and (6) may be used without detracting from the merits of the present invention.

Figure 8:
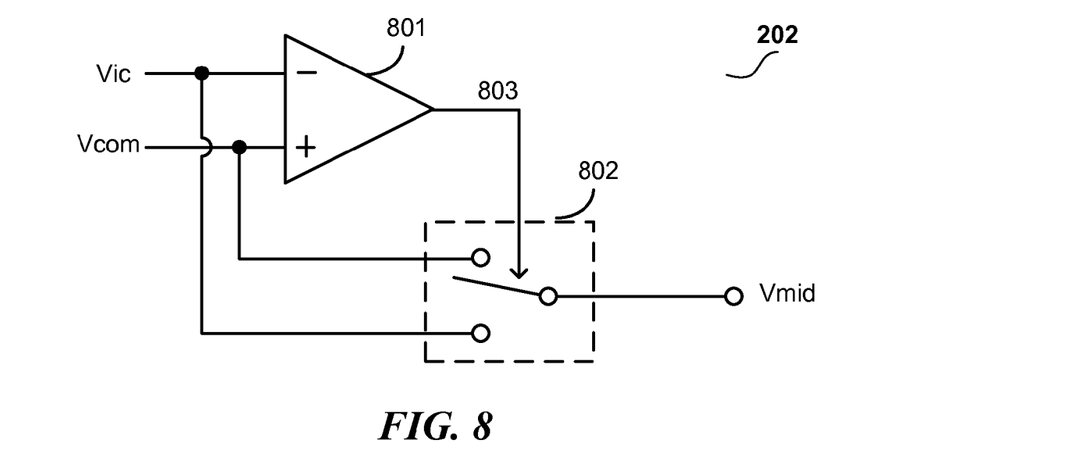
FIG. 8 schematically shows a circuit configuration of a select circuit 202 in accordance with an embodiment of the present invention.

FIG. 8 schematically shows a circuit configuration of the select circuit 202 in accordance with an embodiment of the present invention. As shown in FIG. 8, the select circuit 202 comprises: a select comparator 801 having a first input terminal configured to receive the current reference signal Vic, a second input terminal coupled to the output terminal of the feedback amplifier 201 to receive the amplified feedback signal Vcom, and an output terminal configured to provide a select signal 803 based on the current reference signal Vic and the amplified feedback signal Vcom; a SPDT (Single-Pole Double-Throw) switch 802 having a first input terminal coupled to the output terminal of the feedback amplifier 201 to receive the amplified feedback signal Vcom, a second input terminal configured to receive the current reference signal Vic, a control terminal coupled to the select comparator 801 to receive the select signal 803, and an output terminal configured to provide the amplified feedback signal Vcom or the current reference signal Vic as the current control signal Vmid based on the select signal 803.

In one embodiment, the select signal 803 is logical low when the current reference signal Vic is larger than the amplified feedback signal Vcom. As a result, the first input terminal and the output terminal of the SPDT 802 are connected, and the amplified feedback signal Vcom is chosen to be the current control signal Vmid. The select signal 803 is logical high when the current reference signal Vic is lower than or equal to the amplified feedback signal Vcom. As a result, the second input terminal and the output terminal of the SPDT switch 802 are connected, and the current reference signal Vic is chosen to be the current control signal Vmid.

The operational circuit 402 and the select circuit 202 are simple and common. Persons of ordinary skill in the art may deduce other circuits for replacement after reading the present invention. Also, the operational circuit 402 and the select circuit 202 may be automatically generated by hardware description language, for example, VHDL (Very-High-Speed Integrated Circuit Hardware Description Language) or Verilog HDL, by person of ordinary skill in the art.

Figure 9:
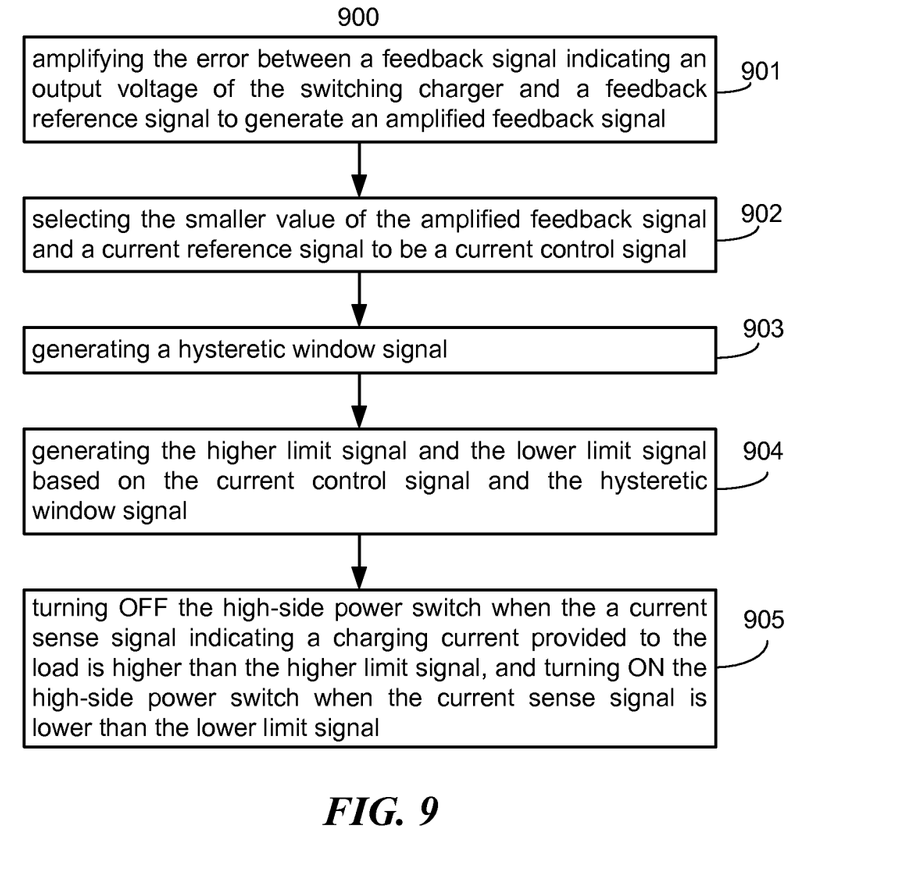
FIG. 9 shows a flowchart 900 of a method for controlling a switching charger having a high-side power switch, a low-side power switch and an inductor in accordance with an embodiment of the present invention.

FIG. 9 shows a flowchart 900 of a control method for a switching charger having a high-side power switch, a low-side power switch and an inductor in accordance with an embodiment of the present invention. The method comprises: step 901, amplifying the error between a feedback signal indicating an output voltage of the switching charger and a feedback reference signal to generate an amplified feedback signal; step 902, selecting the smaller value of the amplified feedback signal and a current reference signal to be a current control signal; step 903, generating a hysteretic window signal; step 904, generating the higher limit signal and the lower limit signal based on the current control signal and the hysteretic window signal; step 905, turning OFF the high-side power switch when the a current sense signal indicating a current flowing through the inductor is higher than the higher limit signal, and turning ON the high-side power switch when the current sense signal is lower than the lower limit signal.

In one embodiment, the step 903 comprises: generating a COT signal having an ON time period directly proportional to the output voltage of the switching charger and inversely proportional to the input voltage of the switching charger; generating the hysteretic window signal based on the comparison of the ON time of the COT signal and the ON time of the high-side power switch; wherein: the hysteretic window signal decreases when the ON time of the high-side power switch is longer than the ON time of the COT signal; the hysteretic window signal increases when the ON time of the high-side power switch is shorter than the ON time of the COT signal; and the hysteretic window signal remains the same when the ON time of the high-side power switch is equal to the ON time of the COT signal.

In one embodiment, the higher limit signal has a value equal to the sum of the current control signal and half of the hysteretic window signal, and the lower limit signal has a value equal to the difference of the current control signal and the half of the hysteretic window signal.

In one embodiment, the higher limit signal has a value equal to the current control signal, and the lower limit signal has a value equal to the difference of the current control signal and the hysteretic window signal.

In one embodiment, the higher limit signal has a value equal to the sum of the current control signal and the hysteretic window signal, and the lower limit signal has a value equal to the current control signal.

It is to be understood in these letters patent that the meaning of "A" is coupled to "B" is that either A and B are connected to each other as described below, or that, although A and B may not be connected to each other as described above, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

This written description uses examples to disclose the invention, including the best mode, and also to enable a person skilled in the art to make and use the invention. The patentable scope of the invention may include other examples that occur to those skilled in the art.

What is claimed are:

1. A switching charger, comprising:
    a control circuit configured to provide a control signal;
    a power stage having a high-side power switch and a low-side power switch coupled in series, the high-side power switch and the low-side power switch turned ON and OFF alternatively by the control signal;
    an inductor having a first terminal coupled to a connection of the high-side power switch and the low-side power switch, and a second terminal coupled to a load, a current flowing through the inductor being limited in a hysteretic window by the control circuit, and the hysteretic window being adjusted according to an ON time of the control signal; and
    an output capacitor having a first terminal coupled to the second terminal of the inductor, and a second terminal coupled to a reference ground;
    wherein the control circuit comprises:
    a feedback amplifier having a first input terminal configured to receive a feedback signal indicating the charging voltage, a second input terminal configured to receive a feedback reference signal, and an output terminal configured to generate an amplified feedback signal based on the feedback signal and the feedback reference signal;
    a select circuit having a first input terminal configured to receive a current reference signal, a second input terminal coupled to the feedback amplifier to receive the amplified feedback signal, and an output terminal configured to generate a current control signal based on the current reference signal and the amplified feedback signal, wherein the current control signal is either the current reference signal or the amplified feedback signal whichever has the lower value;
    a hysteretic control circuit having a first input terminal coupled to the output terminal of the select circuit to receive the current control signal, a second input terminal configured to receive the input voltage, a third input terminal configured to receive the charging voltage, a fourth input terminal coupled to the output terminal of the control circuit to receive the control signal, and a fifth input terminal configured to receive a frequency control signal having pulses when the high-side power switch is turned ON, wherein based on the current control signal, the input voltage, the charging voltage, the control signal and the frequency control signal, the hysteretic control circuit provides a lower limit signal via a first output terminal, and a higher limit signal via a second output terminal;
    a comparison circuit having a first input terminal coupled to the first output terminal of the hysteretic control circuit to receive the lower limit signal, a second input terminal coupled to the second output terminal of the hysteretic control circuit to receive the higher limit signal, a third input terminal configured to receive a current sense signal indicating a current flowing through the inductor, and based on the lower limit signal, the higher limit signal, and the current sense signal, the comparison circuit provides a set signal via a first output terminal, and a reset signal via a second output terminal; and
    a logic circuit having a set terminal coupled to the comparison circuit to receive the set signal, a reset terminal coupled to the comparison circuit to receive the reset signal, and an output terminal configured to generate the control signal based on the set signal and the reset signal.

2. The switching charger of claim 1, wherein the hysteretic control circuit comprises:
    a hysteretic signal generator having a first input terminal configured to receive the input voltage, a second input terminal configured to receive the charging voltage, a third input terminal coupled to the output terminal of the control circuit to receive the control signal, a fourth input terminal configured to receive the frequency control signal, and an output terminal configured to generate a hysteretic signal based on the input voltage, the charging voltage, the control signal and the frequency control signal; and
    an operational circuit having a first input terminal coupled to the output terminal of the hysteretic signal generator to receive the hysteretic signal, a second input terminal coupled to the select circuit to receive the current control signal, wherein based on the hysteretic signal and the current control signal, the operational circuit provides the lower limit signal via a first output terminal, and provides the higher limit signal via a second output terminal.

3. The switching charger of claim 2, wherein the hysteretic signal generator comprises:
   a constant on time (COT) signal generator having a first input terminal configured to receive the input voltage, a second input terminal configured to receive the set signal, a third input terminal configured to receive the charging voltage, and an output terminal configured to generate a COT signal based on the input voltage, the set signal and the charging voltage;
   a charge and discharge circuit having a first input terminal coupled to the COT signal generator to receive the COT signal, a second input terminal coupled to the output terminal of the control circuit to receive the control signal, and an output terminal configured to provide a charge/discharge current based on the COT signal and the control signal; and
   a hysteretic capacitor having a first terminal coupled to the output terminal of the charge and discharge circuit to receive the charge/discharge current, and a second terminal coupled to the reference ground, wherein the hysteretic capacitor provides the hysteretic signal to the first terminal.

4. The switching charger of claim 3, wherein the COT signal generator comprises:
   a first controlled current source having an input terminal configured to receive an internal power supply, a control terminal configured to receive the input voltage, and an output terminal configured to provide a charge current directly proportional to the input voltage;
   a reference capacitor having a first terminal coupled to the first controlled current source to receive the charge current, and a second terminal coupled to the reference ground, wherein the reference capacitor provides a sawtooth signal from the first terminal;
   a frequency switch having a first terminal coupled to the first terminal of the reference capacitor, a second terminal coupled to the second terminal of the reference capacitor, and a control terminal configured to receive the set signal, wherein the frequency switch is turned ON by the pulse of the set signal;
   a controlled voltage source having a control terminal configured to receive the charging voltage, a first terminal configured to provide a COT reference signal directly proportional to the charging voltage, and a second terminal coupled to the reference ground; and
   a COT comparator having a first input terminal coupled to the reference capacitor to receive the sawtooth signal, a second input terminal coupled to the controlled voltage source to receive the COT reference signal, and an output terminal configured to generate the COT signal based on the sawtooth signal and the COT reference signal.

5. The switching charger of claim 2, wherein the operational circuit comprises:
   a second controlled current source having a first terminal configured to receive the internal power supply, a control terminal coupled to the hysteretic signal generator to receive the hysteretic signal, and an output terminal configured to provided a current proportional to the hysteretic signal;
   a first resistor having a first terminal and a second terminal, the first terminal configured to provide the higher limit signal;
   a second resistor having a first terminal coupled to the second terminal of the first resistor, and a second terminal configured to provide the lower limit signal;
   a third resistor having a first terminal coupled to the second terminal of the second resistor, and a second terminal coupled to the reference ground; and
   a clamp circuit having a first terminal coupled to the select circuit to receive the current control signal, and a second terminal coupled to the connection of the first resistor and the second resistor, wherein the voltage at the connection of the first resistor and the second resistor is clamped to the current control signal.

6. A control circuit for a switching charger, wherein the switching charger has a high-side power switch, a low-side power switch and an inductor, the control circuit comprising:
   a feedback amplifier having a first input terminal configured to receive a feedback signal indicating the charging voltage, a second input terminal configured to receive a feedback reference signal, and an output terminal configured to generate an amplified feedback signal based on the feedback signal and the feedback reference signal;
   a select circuit having a first input terminal configured to receive a current reference signal, a second input terminal coupled to the feedback amplifier to receive the amplified feedback signal, and an output terminal configured to generate a current control signal based on the current reference signal and the amplified feedback signal, wherein the current control signal is either the current reference signal or the amplified feedback signal whichever has the lower value;
   a hysteretic control circuit having a first input terminal coupled to the output terminal of the select circuit to receive the current control signal, a second input terminal configured to receive the input voltage, a third input terminal configured to receive the charging voltage, a fourth input terminal coupled to the output terminal of the control circuit to receive the control signal, and a fifth input terminal configured to receive a frequency control signal having pulses at moment when the power stage is turned ON, wherein based on the current control signal, the input voltage, the charging voltage, the control signal and the frequency control signal, the hysteretic control circuit provides a lower limit signal via a first output terminal, and a higher limit signal via a second output terminal;
   a comparison circuit having a first input terminal coupled to the first output terminal of the hysteretic control circuit to receive the lower limit signal, a second input terminal coupled to the second output terminal of the hysteretic control circuit to receive the higher limit signal, a third input terminal configured to receive a current sense signal indicating a current flowing through the inductor, and based on the lower limit signal, the higher limit signal, and the current sense signal, the comparison circuit provides a set signal via a first output terminal, and a reset signal via a second output terminal; and
   a logic circuit having a set terminal coupled to the comparison circuit to receive the set signal, a reset terminal coupled to the comparison circuit to receive the reset signal, and an output terminal configured to generate the control signal based on the set signal and the reset signal.

7. The control circuit of claim 6, wherein the hysteretic control circuit comprises:

a hysteretic signal generator having a first input terminal configured to receive the input voltage, a second input terminal configured to receive the charging voltage, a third input terminal coupled to the output terminal of the control circuit to receive the control signal, a fourth input terminal configured to receive the frequency control signal, and an output terminal configured to generate a hysteretic signal based on the input voltage, the charging voltage, the control signal and the frequency control signal; and an operational circuit having a first input terminal coupled to the output terminal of the hysteretic signal generator to receive the hysteretic signal, a second input terminal coupled to the select circuit to receive the current control signal, wherein based on the hysteretic signal and the current control signal, the operational circuit provides the lower limit signal via a first output terminal, and provides the higher limit signal via a second output terminal.

8. The control circuit of claim 7, wherein the hysteretic signal generator comprises:

a constant on time (COT) signal generator having a first input terminal configured to receive the input voltage, a second input terminal configured to receive the set signal, a third input terminal configured to receive the charging voltage, and an output terminal configured to generate a COT signal based on the input voltage, the set signal and the charging voltage;

a charge and discharge circuit having a first input terminal coupled to the COT signal generator to receive the COT signal, a second input terminal coupled to the output terminal of the control circuit to receive the control signal, and an output terminal configured to provide a charge/discharge current based on the COT signal and the control signal; and a hysteretic capacitor having a first terminal coupled to the output terminal of the charge and discharge circuit to receive the charge/discharge current, and a second terminal coupled to the reference ground, wherein the hysteretic capacitor provides the hysteretic signal on the first terminal.

9. The control circuit of claim 8, wherein the COT signal generator comprises:

a first controlled current source having an input terminal configured to receive an internal power supply, a control terminal configured to receive the input voltage, and an output terminal configured to provide a charge current directly proportional to the input voltage;

a reference capacitor having a first terminal coupled to the first controlled current source to receive the charge current, and a second terminal coupled to the reference ground, wherein the reference capacitor provides a sawtooth signal on the first terminal;

a frequency switch having a first terminal coupled to the first terminal of the reference capacitor, a second terminal coupled to the second terminal of the reference capacitor, and a control terminal configured to receive the set signal, wherein the frequency switch is turned ON by the pulse of the set signal;

a controlled voltage source having a control terminal configured to receive the charging voltage, a first terminal configured to provide a COT reference signal directly proportional to the charging voltage, and a second terminal coupled to the reference ground; and a COT comparator having a first input terminal coupled to the reference capacitor to receive the sawtooth signal, a second input terminal coupled to the controlled voltage source to receive the COT reference signal, and an output terminal configured to generate the COT signal based on the sawtooth signal and the COT reference signal.

10. A control method for a switching charger, wherein the switching charger has a high-side power switch, a low-side power switch and an inductor, the control method comprising:

amplifying an error between a feedback signal indicating an output voltage of the switching charger and a feedback reference signal to generate an amplified feedback signal;

selecting the smaller value of the amplified feedback signal and a current reference signal to be a current control signal;

generating a hysteretic window signal;

generating a higher limit signal and a lower limit signal based on the current control signal and the hysteretic window signal;

turning OFF the high-side power switch when the a current sense signal indicating a current flowing through the inductor is higher than the higher limit signal, and turning ON the high-side power switch when the current sense signal is lower than the lower limit signal.

11. The control method of claim 10, wherein generating a hysteretic window signal comprises:

generating a constant on time (COT) signal having an ON time period directly proportional to the output voltage of the switching charger and inversely proportional to the input voltage of the switching charger;

generating the hysteretic window signal based on the comparison of the ON time of the COT signal and the ON time of the high-side power switch; wherein:

the hysteretic window signal decreases when the ON time of the high-side power switch is longer than the ON time of the COT signal;

the hysteretic window signal increases when the ON time of the high-side power switch is shorter than the ON time of the COT signal; and the hysteretic window signal remains the same when the ON time of the high-side power switch is equal to the ON time of the COT signal.

12. The control method of claim 10, wherein the higher limit signal has a value equal to the sum of the current control signal and half of the hysteretic window signal, and the lower limit signal has a value equal to the difference of the current control signal and the half of the hysteretic window signal.

13. The control method of claim 10, wherein the higher limit signal has a value equal to the current control signal, and the lower limit signal has a value equal to the difference of the current control signal and the hysteretic window signal.

14. The control method of claim 10, wherein the higher limit signal has a value equal to the sum of the current control signal and the hysteretic window signal, and the lower limit signal has a value equal to the current control signal.

* * * * *